Nov. 27, 1934.  E. A. JOHNSTON  1,982,436
TRACTOR DRIVE MECHANISM
Filed Feb. 23, 1933   3 Sheets-Sheet 3

Inventor
Edward A. Johnston
By W. Doolittle Atty.

Patented Nov. 27, 1934

1,982,436

UNITED STATES PATENT OFFICE 1,982,436

TRACTOR DRIVE MECHANISM

Edward A. Johnston, Chicago, Ill., assignor to International Harvester Company, a corporation of New Jersey Application February 23, 1933, Serial No. 658,122

3 Claims. (Cl. 74—327)

The present invention relates to drive mechanisms for tractors.

The main object of the invention is to so dispose the units comprised in a variable speed gear set, brake controlled differential drive, axle shafts, power take-off shafts, etc. of a tractor as to permit the whole to be associated with and housed in compact form within a unitary casing forming the rear portion of the tractor body. Another object is to so construct and relate the aforesaid units as to confine them within the least possible amount of space vertically, so that a maximum amount of ground clearance will be obtainable under the tractor body while providing a central power take-off below the level of the tractor axle, as particularly desirable in row crop tractors of the type shown in copending application Serial No. 658,121 filed February 23, 1933, for which the construction herein disclosed is especially adapted.

The foregoing objects together with other objects and advantages, which will become evident from the description to follow, are attained by mounting the several interrelated shafts for the axles, differential, and transmission across an oblong quadrilateral casing in spaced parallel relation along the longer diameter of the casing, so that all said shafts will lie in proximity to the central longitudinal axis of the casing and occupy a minimum of space vertically, thereby permitting use of a casing of minimum vertical diameter, and by transmitting the drive from a novel form of variable speed drive to the axle shafts through differentially driven brake carrying shafts interjacent the transmission and axle shafts.

A preferred form of the construction embodying the invention is illustrated on the accompanying drawings, where:

Figure 1:
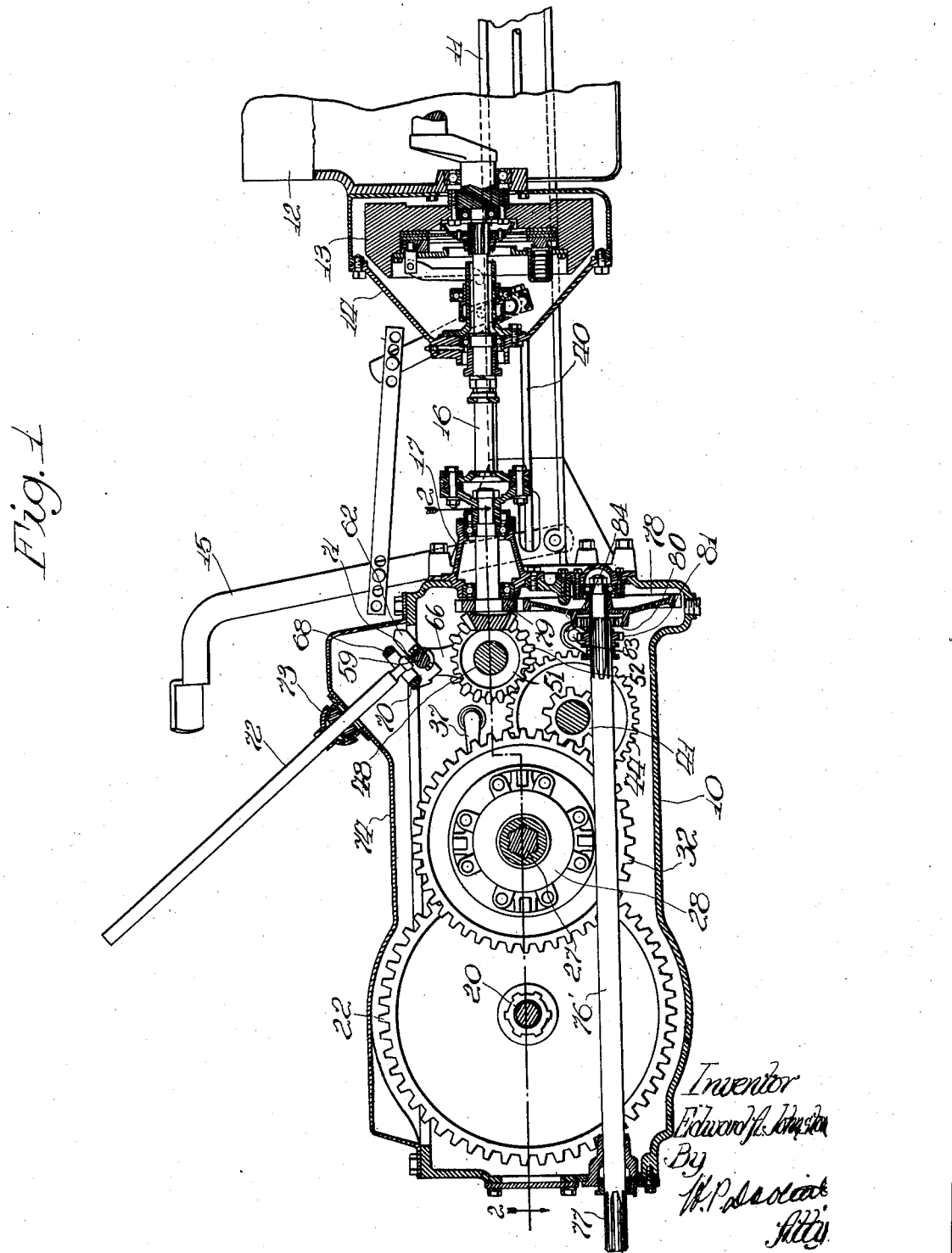
Figure 1 is a side sectional view of the rear portion of a tractor body including the casing and contained parts embodying the invention, the parts being sectioned on substantially the central longitudinal vertical plane of the structure.

The invention is disclosed in connection with the rear portion of a tractor body which comprises a substantially quadrilateral casing 10 at the rear end of the body having forwardly extending sill members 11 (Figure 1) suitably secured to its forward side. These sill members support the usual engine, a part of which is shown at 12, together with a flywheel 13 and master clutch, preferably of the ordinary single plate type shown, enclosed within a housing 14. The clutch is controlled by a pedal lever 15 in the usual manner. The propeller shaft 16 enters through the front wall of the casing 10 where it is supported in the bearing box 17. As shown on Figure 2, each side of the casing 10, near the rear end thereof, is provided with openings in which the inner ends of laterally extending axle housings 18 are seated. The axle housings are formed with radial flanges 18ª bolted or otherwise secured to the outer surface of the casing wall and with reduced annular bearing portions 19 within the casing, in which the inner ends of axle shafts 20 are journaled on ball bearings 21 seated in the annular portions 19. Immediately to the inner sides of these bearings, the axle shafts have fixed thereon the bull gears 22, and the extreme inner ends of these shafts are brought into substantially abutting relation on the center line of the casing.

Figure 3:
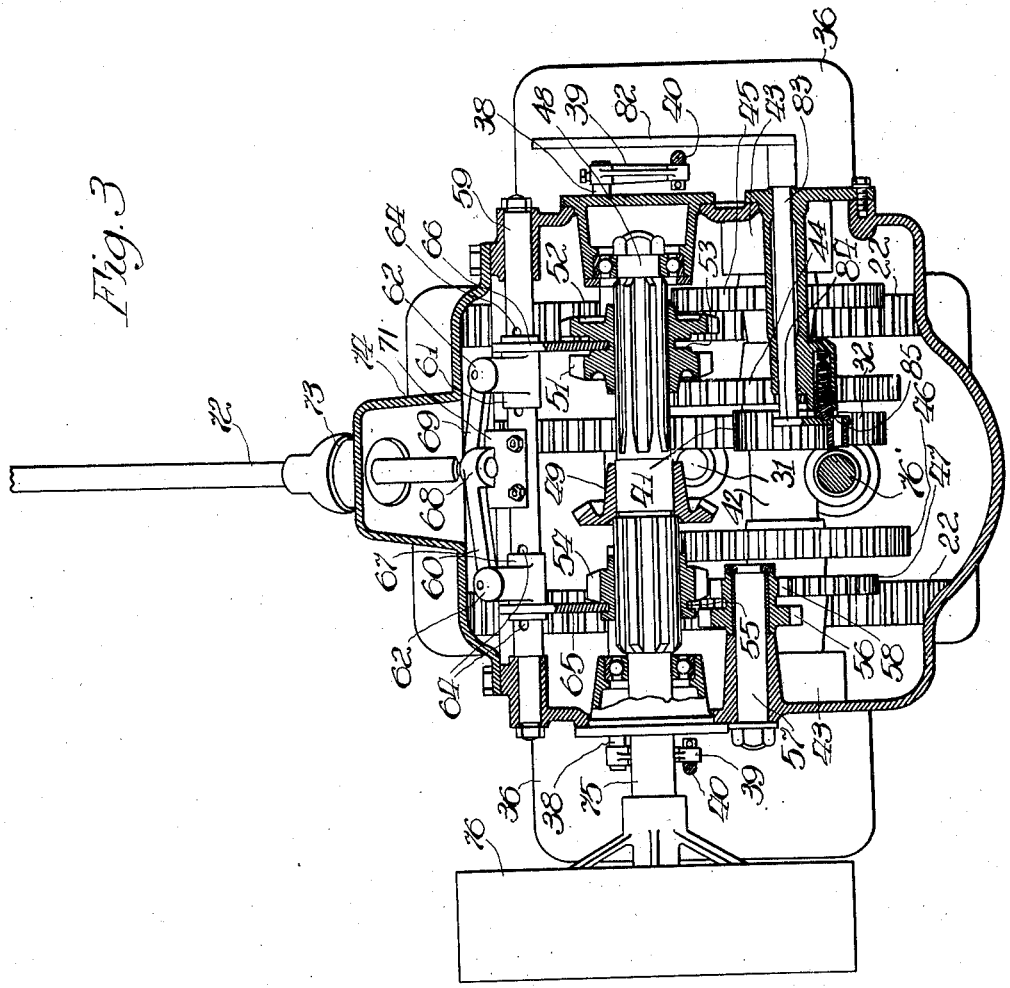
Figure 3 is a vertical, transverse sectional view on the line 3—3 of Figure 2; and, Figure 4 is a detail view of the gear shifters seen in Figures 1 and 3.

Forward of the axle housings and at substantially the same level, the casing 10 has opposite openings for reception of the bearing cages 23 which have radial flanges 24 secured to the outer faces of the casing walls. Each cage 23 is formed with an inner bearing ring 25 and an outer bearing ring 26, which carry ball bearings for differential and brake shafts 27 and the differential connecting the inner ends of those shafts. The differential is of conventional type and comprises the cage or housing 28 formed with opposite sleeves 29, in which the shafts 27 are rotatably received, the sleeves 29 being journaled in the bearings 25. Each shaft 27 has a bevel gear 30 fixed to it within the differential cage, which gears are in mesh with the planetary pinions of the differential carried on the shaft 31 mounted in the differential cage. A ring gear 32 is secured to the differential cage for receiving the drive, and each shaft 27 has a fixed spur gear 33 in mesh with the bull gear 22. The outer end of each differentially driven shaft 27, at the outer side of the casing wall, has secured to it a brake drum 34 cooperating with internal brake shoes 35. Cap housings 36 cover the brake drums. Each brake is controlled by suitable linkage within the casing connected to a crank arm 37 (Figure 1) on the inner end of a rockshaft 38 (Figure 3) journaled in the casing wall. On the outer side of the casing wall, each shaft 38 has a depending crank arm 39 secured to it, which are connected to brake actuating rods 40 operated by suitable brake applying means at the front of the tractor, not shown.

Figure 2:
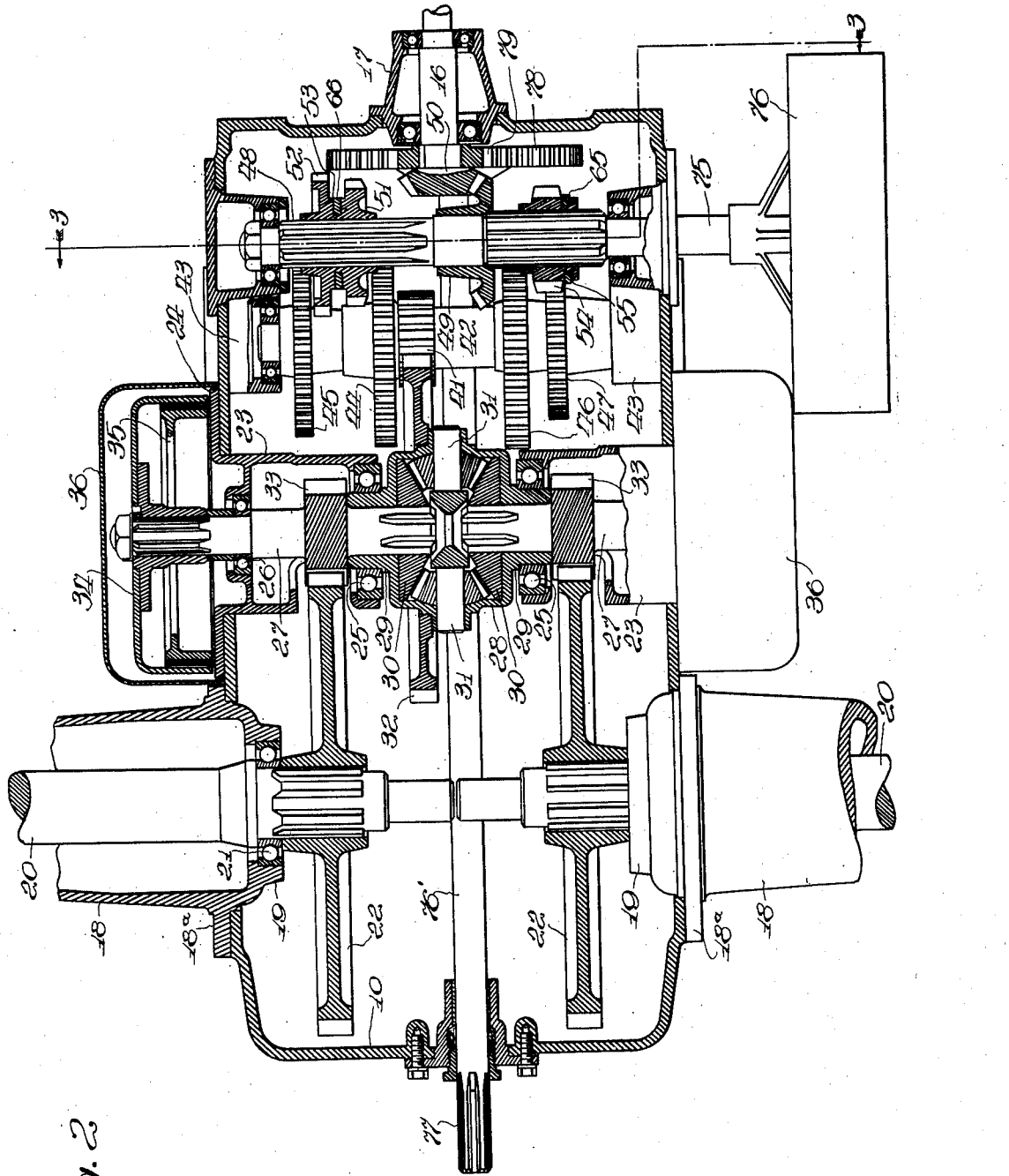
Figure 2 is a sectional top view of the casing and contained parts on an elongated scale, taken on the line 2—2 of Figure 1.

The differential drive gear 32 is in permanent mesh with a spur gear 41 fixed on a secondary transmission shaft 42 which extends across the casing 10 and has its ends journaled in inwardly extending bearing boxes 43 set in the casing walls. At one side of the spur gear 41, the shaft 42 carries two fixed gears of different diameters, the larger gear 44 being for intermediate speed drive forward and the smaller gear 45, for high speed. On the opposite side of spur gear 41, the shaft 42 has two more fixed gears, the larger one, 46, being for first or low speed drive and the smaller one, 47, for reverse drive. The several gears on shaft 42 are driven by shiftable gears on the primary shaft 48 of the transmission which is mounted in the casing similarly to shaft 42 and somewhat forward of and above it, as best seen in Figure 1. The shaft 48 is driven through a fixed bevel pinion 49 near its middle, which is in mesh with a bevel drive pinion 50 on the end of the propeller shaft 16 and spaced from the casing wall. The shaft 48 is splined on each side of pinion 49 and at one side thereof carries the shiftable pinions 51 and 52 which are of different diameters and preferably formed integrally and with an annular fork receiving grooves 53 between them. The smaller of these two pinions 51 is adapted to be moved into mesh with large gear 44 and the larger one, 52, with gear 45. On the opposite side of pinion 49, shaft 48 carries a single slidable pinion 54 formed with an annular fork receiving groove 55 at its side. This pinion is adapted to be moved into mesh with the gear 46 on shaft 42 and, for reverse drive, with a pinion 56 (Figure 3) journaled on a short counter-shaft 57 secured in the casing wall below shaft 48. The pinion 56 is integral with a smaller pinion 58 in permanent mesh with gear 47 on shaft 42.

Figure 4:
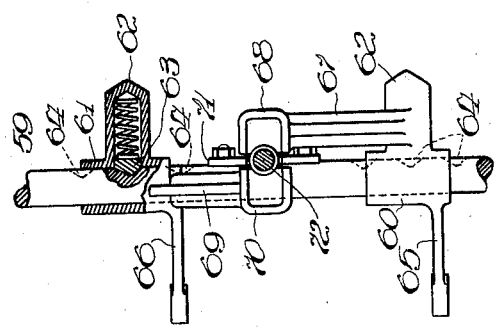

The slidable pinions are selectively brought into mesh with the gears on the secondary transmission shaft by means of a pair of shifter members 60, 61, slidably mounted on a fixed cross-shaft 59 mounted in the casing directly above the primary transmission shaft 48. One shifter member 60 is connected to and movable with pinion 54 and the other shifter member 61 with the joint pinions 51, 52. Each shifter member has a tubular body receiving the shaft 59, which body is formed with a lateral hollow boss 62 enclosing a spring pressed detent 63. These detents are adapted to yieldably seat in complementary notches or depressions 64 formed in the shaft 59 at predetermined points. The shifter 60 includes a depending arm 65 terminating as a fork which engages in groove 55 of pinion 54, and shifter 61 has a similar arm 66 engaging groove 53 between pinions 51, 52. Above the shaft 59, the shifter 60 has an inwardly extending arm 67 terminating in a forwardly facing fork or socket 68, and shifter 61 has a similar, offset arm 69 terminating in the socket 70 facing towards socket 68 and registering therewith, as seen in Figure 4, when the shiftable pinions are in neutral. In this position, the sockets 68 and 70 are on opposite sides of a central vertical slot or notch in an upright plate 71 secured on shaft 59. The sockets 68, 70 receive the lower end of a shifter lever 72 mounted in a ball and socket bearing 73 in the cover plate 74 of the casing 10. On the drawings the shifter lever and associated shifter members and gears are shown as in neutral position with the shaft 48 running idle. Forward swing of lever 72 will cause engagement of socket 68 and permit shifter 60 to be moved to the right for first speed and to the left for reverse, by opposite movements of the lever. Rearward swing of the lever causes engagement of socket 70 and similar movements will then engage high or second speed. When any of the gear trains are in mesh, the plate 71 prevents other than lateral movement of lever 72 until it is first returned to neutral. In addition to its function as the primary transmission shaft, shaft 48 serves as a power shaft by being extended laterally through the right hand wall of the casing, as at 75, and there may be provided with a belt pulley 76 or equivalent device as a source of power to driven implements. In addition to this source of power, the lower part of the casing 10 carries a longitudinally extending power shaft 76' journaled in bearings in the front and rear walls of the casing and projecting as a splined end 77 beyond the rear wall. Adjacent its bearing in the front wall of the casing, shaft 76' has a drive gear 78 journaled on it which is in permanent mesh with a drive pinion 79 fixed on the rear end of propeller shaft 16 in the space between bevel pinion 50 and the casing wall. The rear face of gear 78 is formed with a clutch portion 80 cooperating with a shiftable clutch member 81 splined on shaft 76'. As shown on Figure 3, the clutch member 81 is shifted to connect or disconnect shaft 76 and gear 78 by means of a hand lever 82 on the left hand side of the casing 10. This lever is secured on a shaft 83 extending into the casing and having a crank arm 84 on its inner end engaging an annular groove in the clutch member 81 (Figure 1). A spring pressed detent 85 engages arm 84 to hold the clutch in either engaged or disengaged position. The shaft 76 may accordingly be driven at engine speed whenever desired and is particularly adapted for substantially straight line driving of such implements as harvesting implements, etc. pulled behind the tractor, due to its location below the level of the axle and in the longitudinal median line of the oblong casing.

The construction and arrangement of parts herein disclosed represents the preferred embodiment of the invention, but variations therefrom are possible without departure from the scope of the invention as defined in the following claims.

What is claimed is:

1. A rear end drive assembly for tractors comprising a substantially quadrilateral oblong casing with its longest diameter extending fore and aft of the tractor body and its shortest diameter extending vertically, aligned tubular axle housings extending laterally from said casing near its rear end, axle shafts journaled in said housings with their inner ends extending to the center of the casing, a bull gear on each axle shaft within the casing, a pair of aligned drive shafts mounted across the casing forward of the axle shafts to project beyond the sides of the casing and having drive pinions in mesh with the respective bull gears, brakes mounted on the ends of the drive shafts beyond the casing walls, cap housings on the walls of the casing for enclosing said brakes, brake actuating means entering the sides of the casing forward of the cap housings and operating said brakes from within the casing, a differential connecting the drive shafts, a variable speed transmission comprising shafts mounted across the forward portion of the casing and connected to drive the differential.

2. A rear end drive assembly for tractors comprising a substantially quadrilateral oblong casing with its longest diameter extending fore and aft of the tractor body and its shortest diameter extending vertically, a propeller shaft entering the forward wall of the casing at right angles and having a bevel drive pinion on its end within said casing and spaced from said wall, a drive gear on the propeller shaft between the casing wall and the bevel drive pinion, a variable speed transmission having shafts extending across the casing and driven by said bevel pinion, a pair of aligned drive shafts extending across the casing, a differential connecting said shafts and driven from the transmission, a pair of aligned axle shafts parallel to said drive shafts, a driving connection between each drive shaft and an axle shaft, a power take-off shaft extending from end to end of the casing below and in proximity to said shafts and projecting through the rear end wall of the casing near its lower edge, and a driving connection between the drive gear on the propeller shaft and the power take-off shaft including clutch mechanism for controlling said driving connection.

3. A rear end drive assembly for tractors comprising a substantially quadrilateral oblong casing with its longest diameter extending fore and aft of the tractor body and its shortest diameter extending vertically, a propeller shaft entering the forward wall of the casing at right angles, a primary transmission shaft mounted across the casing and driven by the propeller shaft, said transmission shaft being extended beyond one side wall of the casing to form a belt pulley shaft, a secondary transmission shaft drivable at variable speeds from said primary shaft, differentially connected axle shafts mounted across the casing and driven by the transmission, means within the casing for braking the respective axle shafts, a power take-off shaft extending longitudinally of the casing below said transmission and axle shafts and projecting from the rear wall thereof near its lower edge, and a clutch controlled driving connection within the casing between the propeller shaft and the power take-off shaft.

EDWARD A. JOHNSTON.